United States Patent
De Barros et al.

(10) Patent No.: US 11,182,446 B2
(45) Date of Patent: Nov. 23, 2021

(54) METHODS AND SYSTEMS FOR PERSONALIZED, ZERO-INPUT SUGGESTIONS BASED ON SEMI-SUPERVISED ACTIVITY CLUSTERS

(71) Applicant: Microsoft Technology Licensing, LLC, Redmond, WA (US)

(72) Inventors: Marcelo Medeiros De Barros, Redmond, WA (US); Aman Singhal, Belleview, WA (US); Prithvishankar Srinivasan, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 190 days.

(21) Appl. No.: 16/137,259

(22) Filed: Sep. 20, 2018

(65) Prior Publication Data

US 2020/0097607 A1 Mar. 26, 2020

(51) Int. Cl.
*G06F 7/00* (2006.01)
*G06F 16/9535* (2019.01)
*G06F 16/955* (2019.01)
*G06F 16/2457* (2019.01)
*G06F 3/0482* (2013.01)

(52) U.S. Cl.
CPC ........ *G06F 16/9535* (2019.01); *G06F 3/0482* (2013.01); *G06F 16/24578* (2019.01); *G06F 16/9566* (2019.01)

(58) Field of Classification Search
CPC ............. G06F 16/9535; G06F 16/9566; G06F 16/24578; G06F 3/0482

USPC .................................................. 707/600–899
See application file for complete search history.

(56) References Cited

U.S. PATENT DOCUMENTS

| 7,953,730 B1 * | 5/2011 | Bleckner ............... G06F 16/951 707/722 |
| 8,204,897 B1 * | 6/2012 | Djabarov ............ G06F 16/3346 707/767 |
| 2010/0161583 A1 | 6/2010 | Sareen et al. |
| 2012/0296743 A1 | 11/2012 | Velipasaoglu et al. |
| 2014/0188926 A1 * | 7/2014 | Chandel ................ G06F 16/435 707/767 |

OTHER PUBLICATIONS

"International Search Report and Written Opinion Issued in PCT Application No. PCT/US19/038077", dated Aug. 29, 2019, 13 Pages.

* cited by examiner

*Primary Examiner* — Isaac M Woo
(74) *Attorney, Agent, or Firm* — Faegre Drinker Biddle & Reath LLP

(57) ABSTRACT

Examples of the present disclosure describe systems and methods that provide a pipeline to generate personalized queries that are associated with and based on a user's interests determined from a user's past searches, on an Internet search engine, and/or the content the user viewed from the past searches. The suggested queries can be shown in a user interface component associated with the user interface of the search engine and before the user enters anything, such as a new Internet search. This pre-population of searches associated with a user's interests gives an opportunity to the user to try these queries without manually entering in a search string.

20 Claims, 13 Drawing Sheets

METHODS AND SYSTEMS FOR PERSONALIZED, ZERO-INPUT SUGGESTIONS BASED ON SEMI-SUPERVISED ACTIVITY CLUSTERS

BACKGROUND

When using an Internet search engine, a user enters a series of words or phrases associated with the content the user desires. The user is then provided a list of websites that are related to the searched words or phrases and may be related to the content desired. The user must then search for and select the desired content from the list of websites or, if the desired content is not found, conduct another search. Often a user desires content that is similar to content previously viewed. However, most websites offer only past search history from which to select, which can only reproduce content the user has previously seen. Generally, the search services do not anticipate the needs of the user.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for providing personalized suggestions, without user input, for search entry points based on content returned during past searches. The system can provide a user interface for displaying no-query search suggestions (for example, when a user first clicks on the search box for a given search engine). The suggested searches can be personalized based on user's previous activities.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
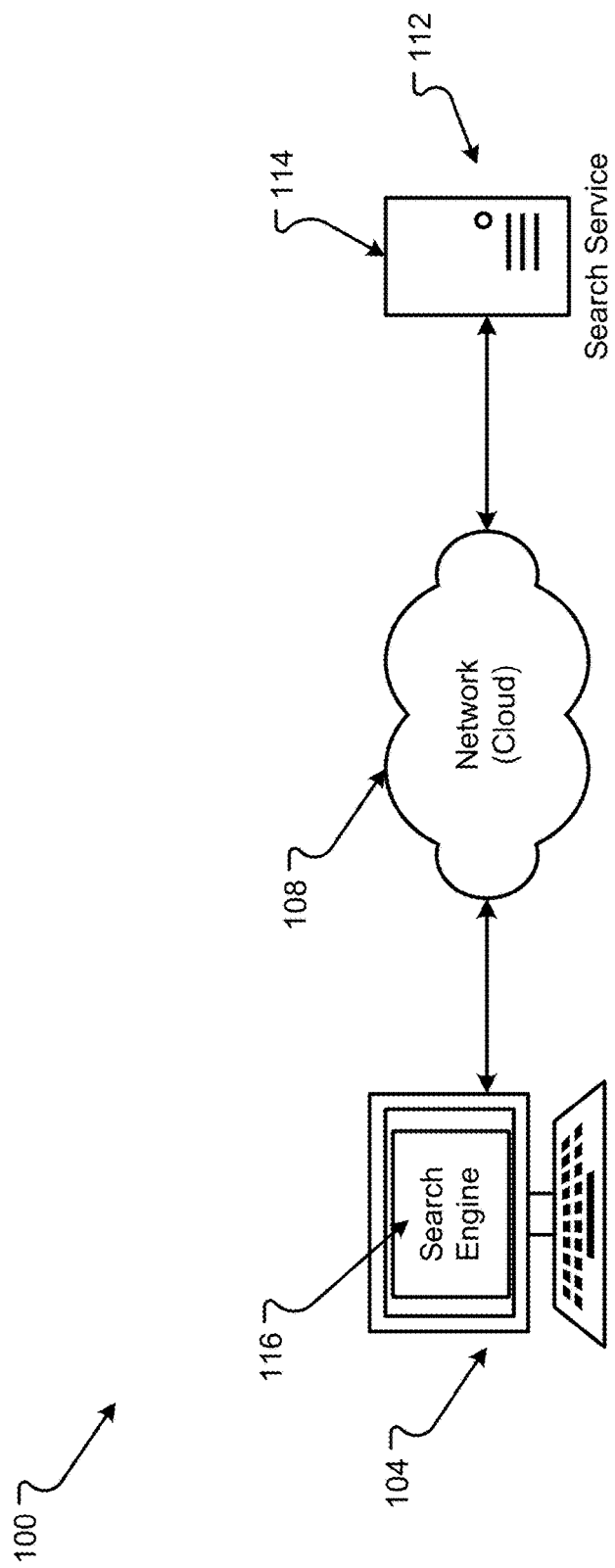
FIG. 1 illustrates system for providing personalized search suggestions in accordance with the aspects a of the disclosure.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The systems and methods herein provide a pipeline to generate personalized queries that are associated with and based on a user's interests determined from a user's past searches on one or more Internet search engine(s) (e.g., Bing.com, Google, etc.). The suggested queries can be shown in a user interface component associated with the user interface of the search engine and before the user enters anything. This pre-population of searches associated with a user's interests provides an opportunity for the user to try these queries without manually entering a search string. While examples disclosed herein are described with respect to a search engine, one of skill in the art will appreciate that the disclosed aspects may be employed using other types of search tools such as file system searches, document managements systems, image repositories, etc. Furthermore, aspects of the disclosure may be practiced with other types of user interface components, such as UI components that are part of a browser, file system, document management system, operating system, a personal digital assistant, etc.

To determine a user's interests, the system can extract key phrases from the uniform resource locators (URLs) (website page content) visited by the user. The interests, described by the key words or phrases can then be tagged to each user. New personalized queries may then be generated based on the tagged key words and the metadata associated with the tagged key words.

To generate the personalized queries, the system first extracts a user's anonymous identifier (ANID) and/or client identifier (ID), any queries which the user typed into the search engine, and/or any website URLs which the user selected from those returned based on the search requested. Then, the system extracts key words and/or key phrases from the selected URLs. This word/phrase extraction is achieved by parsing and extracting a text snippet from the URL and performing natural language processing (NLP) techniques on the key word(s)/phrase(s). Using a part-of-speech (POS) tagger, the system can find the subject words/phrases in the text snippet. Then, the system can allocate confidence scores for the words/phrases by measuring the authority of the keyword/phrase with respect to the URL content. The system may then associate the key word/phrase information with the user information and store the data for the user.

Next, the system can create another table which contains multiple queries related to each key phrase. This query generation uses a process of reverse mapping of high impression websites (websites that are closely related to the key word/phrase) to the queries that return the high impression websites at the top of the search results. Based on determining the most effective queries, the system can assign each query a confidence score (a measure of how likely the query returns the desired results and/or key word/phrase) with respect to a key phrase, which may be based on which position the originally-selected URL occurs in the search results.

A configuration of a system 100 for determining personalized search suggestions, as described herein, may be as shown in FIG. 1. The system 100 can include a computing device 104 connected to or in communication with, through a network or cloud 108, a server executing a search service 112. The computing device 104 can be any type of computing device, for example, computing device 800, 900, 902, etc., as may be described in conjunction with FIGS. 8-11. The network 108, likewise, may be any kind of network interconnection such as a local area network (LAN), a wide area network (WAN), a wireless LAN (WLAN), the Internet, etc., for example, network 1015, as described in conjunction with FIG. 10.

Figure 10:
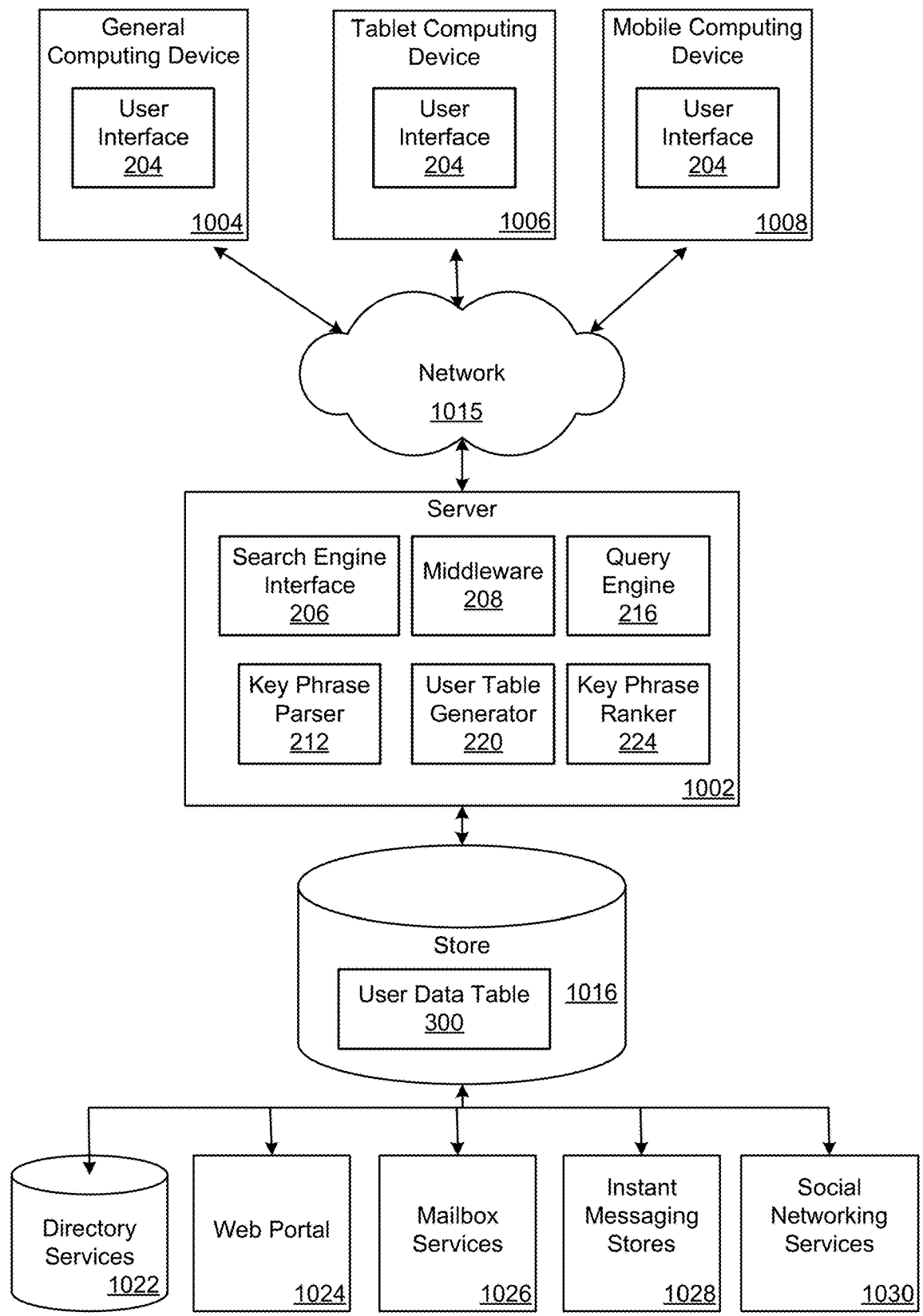
FIG. 10 is a simplified block diagram of a distributed computing system in which aspects of the present disclosure may be practiced.

The search service 112 may be executed on a server 119 or other type of computing device, for example, server 1002, as described in conjunction with FIG. 10. The search service 112 can be a search engine or other type of application that receives and executes queries for Internet content. For example, the search service 112 can include Google, Bing, etc. The computing device 104 may execute a user interface (UI) 116. The user interface 116 can be a client component of the search service 112 that is executed on the server 114. This UI component 116 may consist of a webpage that interfaces with the search service 112, for example, the UI shown in FIG. 4.

Figure 2:
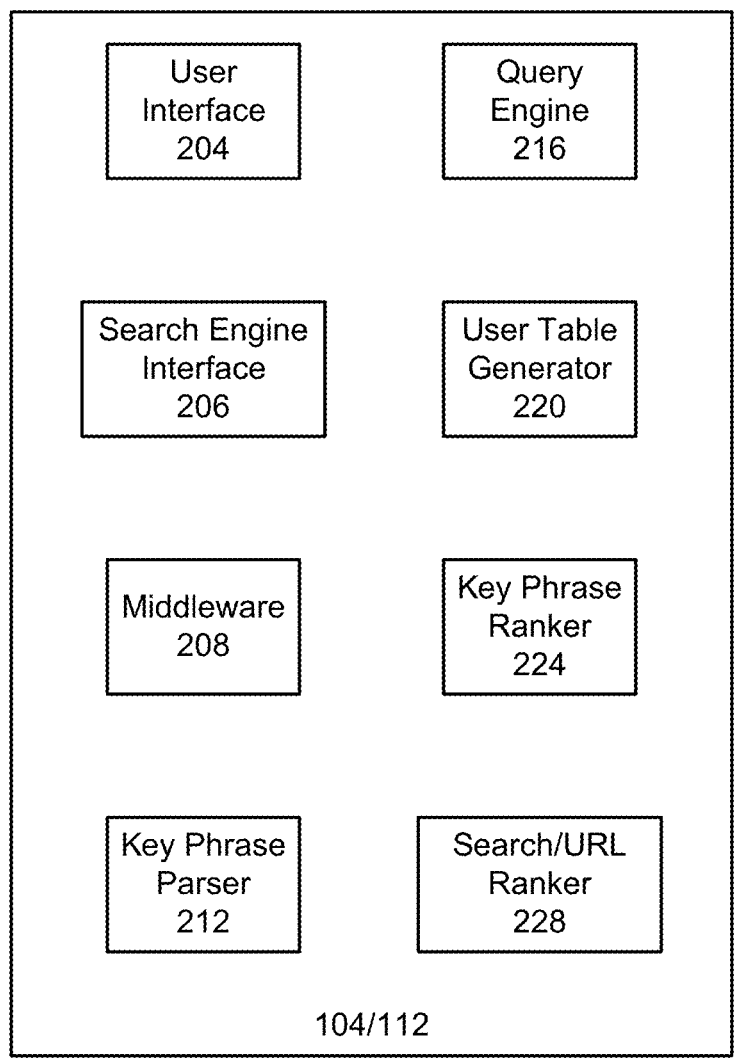
FIG. 2 illustrates components of the system for providing personalized search suggestions in accordance with the aspects of the disclosure.

An example configuration of components associated with system 100, which may be embodied in hardware and/or software, may be as shown in FIG. 2. The components may be part of or executed by the computing device 104 and/or the server 114. For example, the computing device 104 may execute one or more of, but not limited to: a user interface 204. A server 114 may execute one or more of, but not limited to: a search engine interface 206, middleware 208, a key phrase parser 212, a query engine 216, a user table generator 220, a key phrase ranker 224, and/or a search URL ranker 228. The particular division of components between the computing device 104 and server 114 is not limited to this arrangement but may be reorganized based on the needs of the process, system, etc. Further, there may be more of fewer components than those components 204-228 shown in FIG. 2. Each of the components 204-208 may conduct functions as described hereinafter.

A user interface 204 may be as described in conjunction with FIGS. 4, 8-11. Thus, a user interface 204 can produce a window or other display on a computing device 104 and may receive inputs from a user through one or more human-machine interfaces, e.g., a mouse, a keyboard, etc. More particularly, the user interface 204 can include any components used to render a web page for a search engine and receive queries from a user on the computing device 104.

The search engine interface 206 can be the interface to the client computer 104 that is in communication with the server 114 executing the search service 112. The search engine interface 206 can provide the user interface information and/or other information rendered by the user interface component 204, inside of a webpage or other human machine interface, on the client device 104.

Middleware 208 can be any component to provide inputs, from the search engine interface 206, to other components 212-228 described herein. Further, the middleware 208 can receive outputs from the various components 212-228 described herein and provide those outputs back to the search engine interface 206 for display. The middleware 208 can be, for example, XAP or another type of file extension, an application programing interface (API), or other component that may provide for interactions between the operating system, the client device 104, and/or the components 212-228 described herein.

The key phrase parser 212 may be any component that can use natural language processing (NLP), morphological segmentation, word segmentation, terminology extraction, part-of-speech (POS) tagging, machine learning, or other types of operations/algorithms to extract key words or key phrases from content selected by a user in the user interface 204. For example, after a user-conducted search, the user may select one or more websites to view content associated with those selected websites. The selected websites may be parsed, by the key phrase parser 212, to extract key words or key phrases from the content. These key words and key phrases may them be evaluated to determine the key word's/phrase's importance in the content. A higher importance, associated with a word/phrase, influences the system to use that word/phrase as indicative of the content desired. The importance may be determined using the same or other language processing functions mentioned above.

The key words/phrases may then be stored and used to generate content-based searches. Content-based searches, once identified, may be provided, through the middleware 208, to the search engine interface 206 in future sessions between the user and the search engine. In this way, the user is provided personalized searches, based on content previously viewed, without needing to enter a new query.

Alternatively or additionally, the key phrase parser 212 may also provide content, such as a website or URL, through the middleware 208, to the search engine interface. Thus, rather than providing another search, the key phrase parser 212 output can be used to determine other content in other websites that may be of interest to the user. These other websites may be provided as suggestions to the user rather than or in addition to the suggested searches. In this way, the user may be provided with content-based websites or content-based URLs in addition to or alternatively to the searches.

A query engine 216 can operate to query the Internet based on the key words/phrases determined by the key phrase parser 212. The query engine 216 can execute one or more queries on the output of the key phrase parser 212. Each query can have one or more key words/phrases. Further, the arrangement or configuration of each query can change. For example, the order of key words/phrases may be modified, a time limit or temporal component (e.g., only return websites with changes in the last week) may be added, limitations on the type of data desired may be added (e.g., limit output to images, videos, news, etc.), limits on whether to use the query verbatim may be added, limits on what geographic region to use may be added, etc. The results returned by the query engine 216 can be analyzed. Those queries that return the key words/phrases in the content higher in the list of returns may be more efficacious and represent the best searches. This query information may be returned or provided to the search/URL ranker 228 and/or key phrase ranker 224.

The user table generator 220 can generate data regarding the user. This data can include any or all of the data, as described in conjunction with FIGS. 3A and 3B. The user table generator 220 may obtain information from the key phrase parser 212, query engine 216, key phrase ranker 224, search URL ranker 228, and/or other components. This information may be stored and/or organized into a database, file, etc. whether a flat file database, relational database, or other types of file systems or databases.

The key phrase ranker 224 may provide a ranking or an order to the queries generated by the query engine 216. In other words, the key phrase ranker 224 can determine the authority of the keyword/phrase with respect to the user-selected URL content. The key phrase ranker 224 can execute language processing or other functions or processes, as mentioned above, to generate the rankings. For example, if the keyword/phrase is prominent (occurs frequently or more prominently) within a user-selected URL, that keyword/phrase has a higher authority score. The output from the key phrase ranker 224 can be used by the query engine 216 to determine which queries to run or can be used by the search/URL ranker 228 to determine which key words/phrases to identify in the returned results from the searches. The rank or order of the key words/phrases may be stored by the user table generator 220 to influence future content-based searches or content-based URL suggestions provided to the user.

The search/URL ranker 228, similar to the key phrase ranker 224, can rank outputs from other components. In particular, the search/URL ranker 228 can rank or order the queries and/or content returned from the query engine 216. Thus, as the query engine 216 returns query results for a query, the search URL ranker 228 can determine which queries return high impression websites and can calculate a confidence score or other rank for how well the query identified the desired content. A high impression website may be a website that is closely related to the key word/phrase (the key word/phrase occurs frequently and prominently within the website) or to a website previously selected by the user. The search/URL ranker 228 may determine if a query returns high impression websites in a higher order in the query results. The higher frequency of high impression websites and the higher order of those websites can receive a better ranking in a set of possible queries. A confidence score can be a determination of how related the query or returned-results are to what a user desires to view. Thus, a confidence score may be based on which position the originally-selected URL (the URL to which the key words/phrases were extracted) occurs in the search results. In other words, a query that returns the user's past selections has a higher confidence scores. The authority and confidence scores can be provided to the user table generator 220 by the search/URL ranker 228.

Figure 3A:
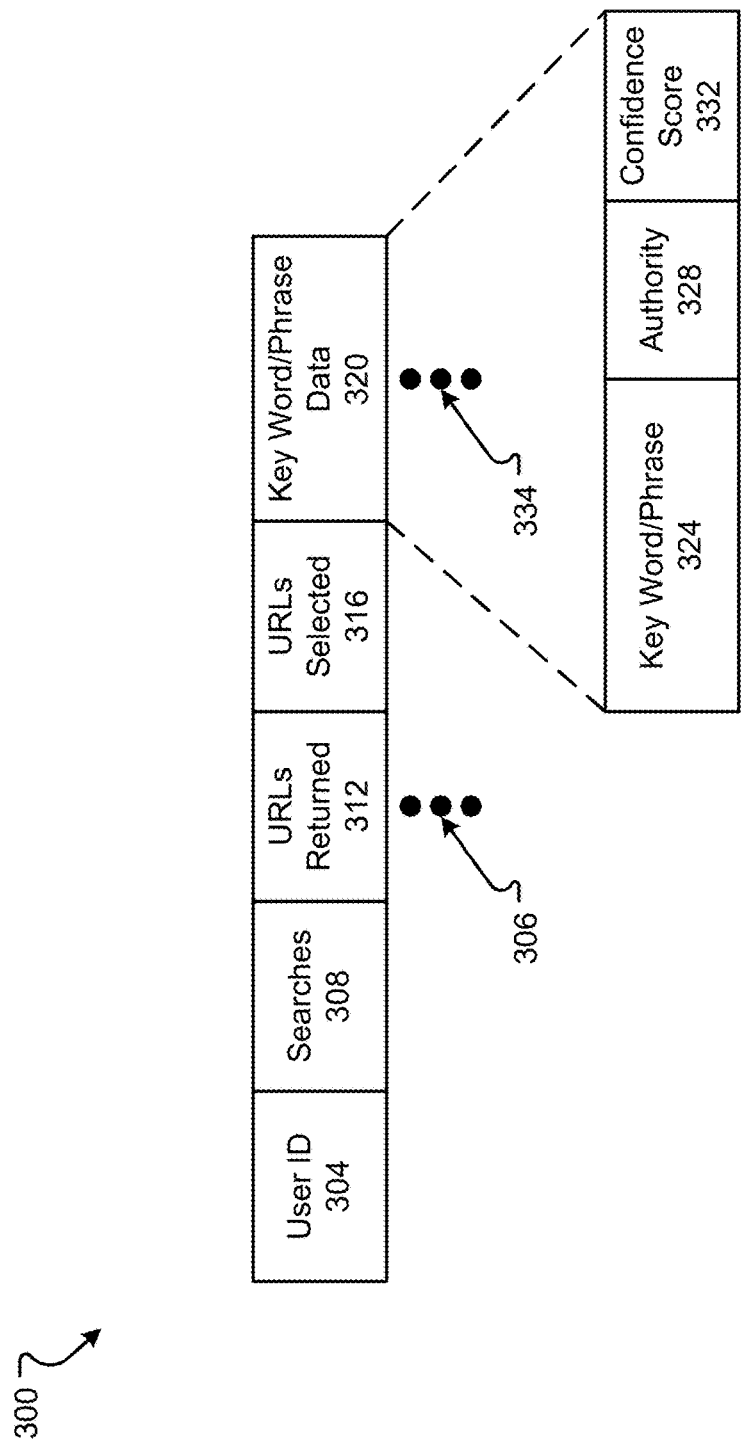
FIG. 3A illustrates a portion of a user data table for providing personalized search suggestions in accordance with the aspects of the disclosure.

A configuration of at least a portion of a user data able data structure 300 may be as shown in FIG. 3A. The user data table 300 may include one or more fields or portions, but is not limited to, for example, a user identifier (ID) 304, a searches field 308, a URLs returned field 312, a URLs selected field 316, and/or key word/phrase data 320. For each user there may be a different set of data, and thus, there may be more or fewer tables 300 than that shown in FIG. 3A, as represented by ellipses 306. Further, for each user ID 304 there may be a set of key word/phrase data 320, based on a past search conducted by the user, and thus, there may be more or fewer key word/phrase data fields 320 than those shown in FIG. 3A, as represented by ellipses 334. Each key word/phrase data 320 field may include further subdivisions of data, including, but not limited to: a key word/phrase field 324, an authority field 320, and a confidence score field 332.

The user identifier 304 can be any identifier including, but not limited to: a numeric identifier, an alphabetic identifier, an alphanumeric identifier, a global unique identifier (GUID), etc. The user ID can also be an anonymous identifier (ANID) (e.g., a cookie ID generated by the analytics servers and assigned to each computing system 104 contacting the server 112) as used by the system 100 to identify the device 104 being used by a user. Thus, the user ID 304 can identify the device 104 used by user. Alternatively or additionally, each user can be assigned an identifier that can identify a user separate from a device 104. This ID may require a user to login to a system with a username and password and/or other identifying credentials and/or information. Then, the username or an ID, associated with the user's credentials, may identify the user. The user ID 304 can uniquely identify that user of that device 104 from other users or devices that may interact with the search service 112.

The searches 308 field can include, for example, each search string provided by a user into the search engine. For example, the user can enter search strings: "Denver Broncos," "Denver skyline," "Denver restaurants," etc., which may be different types of searches that are related to the City of Denver. Each search string including, but not limited to the words or phrases used and any associated metadata or parameters may be stored in the searches field 308. The metadata or parameters can include, for example, any temporal limits, any geographical limits, any type of data limits, etc.

URLs returned 312 can include, but is not limited to: any set of the URLs (websites) returned from the searches stored in the searches field 308. Thus, for each search 308, there may be a listing of URLs returned 312 stored with and associated with the search in the searches field 308. The number of URLs returned, based on a search, can be numerous and, thus, may have a maximum top limit. For example, only the top 10 URLs returned from a search 308 may be saved in the URLs returned 312.

From the URLs returned 312, a listing of URLs selected 316 may be separated or identified. A selected URL 316 can be a URL that the user selected, from the URLs returned, to view content associated with the URL. Thus, the URL selected field 316 may store one or more URLs that the user clicks on and which causes the Internet browser to send a signal to that URL to retrieve content back to the user interface 116. For each URL stored in the URL selected 316, that selected URL is also included in the URLs returned field 312.

The key word/phrase data 320 can include any data regarding the content within the URLs stored in the URL selected 316. For example, the key word/phrase parser 212 may store the key word/phrases into field 324. Further, the key phrase ranker 224 and/or search URL ranker 228 can determine information or parameters regarding the key word/phrases 324, for example, the authority 328 and/or confidence score 332, and store that information in the key word/phrase data field(s) 320. The key word/phrases data 324 can include the words and/or phrases, the order of the key words/phrases, and/or any metadata or parameters used to conduct searches by the query engine 216. Thus, the key word/phrases data 324 may include any temporal limits, any geographical limits, any type of data limits, etc., associated with the key word/phrases data.

The authority 328 data can include any ranking or scoring of the authority of the key word/phrases data 324. For example, the authority 328 can be an algorithmic score of how frequent and/or prominently the key word/phrases data 324 is provided in the user-selected URL 316. The scoring or ranking may be measured against other key words/phrases. For example, keyword 1 is listed two more times or 25% more than key word 2. Thus, key word 1 will have a higher authority score than key word 2. By comparing the set of key words/phrases in the user-selected URL content, the key words/phrases with the highest authority can be determined and listed or ranked in the authority field 328.

The confidence score 332 can be a measure of how often and how prominently searching the key words/phrases in the key word/phrases data 324 will return the URLs selected 316. For example, if searching key word 1 returns 90% of the URLs selected 316 and/or the URLs selected 316 are 80% of the time within the top ten results, the confidence score of key word 1 may be, for example, 90. In contrast, if searching key word 2 returns 60% of the URLs selected 316 and/or the URLs selected 316 are 70% of the time within the top ten results, the confidence score of key word 2 may be, for example, 70. Thus, by iteratively comparing the results generated in searches of the various key word/phrases data 324, a confidence score 332 for each key word/phrases data 324 can be determined and those confidence scores 332 can be ranked or ordered for the two or more key word/phrases data 324.

Figure 3B:
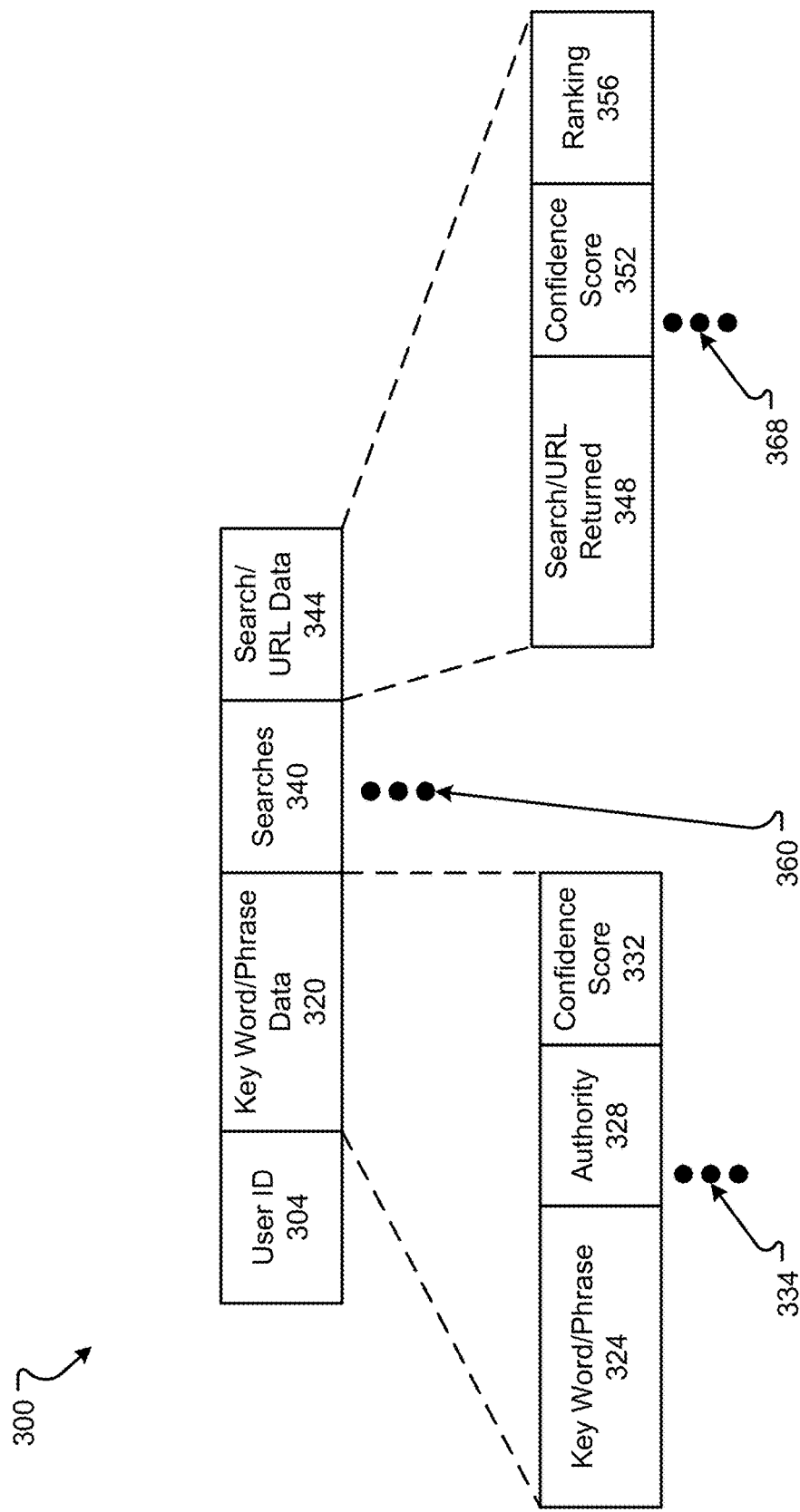
FIG. 3B illustrates another portion of a user data table for providing personalized search suggestions in accordance with the aspects of the disclosure.

A further configuration of at least a portion of a user table data structure 300 may be as shown in FIG. 3B. The user table data structure 300 may include one or more fields or portions, but is not limited to, for example, a user identifier (ID) 304, key word/phrase data 320, a searches field 340, and/or search/URL data 344. For each user there may be a different set of data, and thus, there may be more or fewer tables 300 than that shown in FIG. 3B, as represented by ellipses 360. Further, for each user ID 304 there may be a set of search/URL data 344, based on personalized, content-based suggestions that are associated with the user's past-viewed content, and thus, there may be more or less search/URL data 344 than that shown in FIG. 3B, as represented by ellipses 368. The fields having the same numeric identifier, e.g., fields 304, 320, 324, 328, and/or 332, may be the same or similar to those fields described in conjunction with FIG. 3A and will not be described again.

The searches 340 field can include, for example, each search string created and tested by the query engine 216 with the search engine. For each key word or key phrase, the query engine 216 can try a different search having a different order or arrangement of the words or different metadata, for example: "Denver Broncos," "the Broncos," "Broncos Denver," etc., which may generate different results for each search. The metadata or parameters can include, for example, any temporal limits, any geographical limits, any type of data limits, etc. Thus, metadata can also change for each search, for example, a temporal limit can limit results to the past year, a type limit can limit the results to only news or images, etc. Each search string, including, but not limited to, the words or phrases used and the arrangement thereof and any associated metadata or parameters may be stored in searches field 340.

A search/URL data field 344 can store the URLs returned from and associated with the search 340 and any concomitant data associated therewith. The search/URL data field 344 can include one or more of, but is not limited to: a search/URL returned field 348, a confidence score field 352 and/or a ranking field 356. For each search 340, there may be one or more sets of search/URL data 344. As such, there can be more or fewer sets of search/URL data 344 than those shown in FIG. 3B, as represented by ellipses 368.

The search/URL returned field 348 can include a listing of a least a portion of the URLs returned from a search 340 generated and tested by the query engine 216. Thus, the search/URL returned field 348 includes at least one URL associated with the search 340. Further, the search/URL returned field 348 can include other metadata, including one or more of, but not limited to: the order of the URLs returned, a number of times the key word/phrase 328 occurred in the URL, a prominence of the key word/phrase 328 as found in the URL, etc. From this information, the search/URL ranker 228 can determine the efficacy of the proposed search suggestion.

The confidence score 352 can be a measure of how effective the tested search 340 is in producing results the user may desire. This confidence score 352 may measure how often and how prominently the key words/phrases 328 are found in the URLs returned 348. Further, the confidence score 352 can measure if the tested search 340 will return the URLs selected 316. For example, if searching key word 1 returns 90% of the URLs selected 316 and/or those URLs selected 316 are 80% of the time within the top ten results, the confidence score of the search 1 may be, for example, 90. In contrast, if searching key word 2 returns 60% of the URLs selected 316 and/or those URLs selected 316 are 70% of the time within the top ten results, the confidence score of this alternative search 2 may be, for example, 70. Thus, by iteratively comparing the results generated in tested searches 340 of the various key word/phrases data 324, a confidence score 352 for each search 340 can be determined and those confidence scores 352 can be ranked or ordered for the two or more searches 340, which ranking can be stored in ranking field 356.

Alternatively or additionally, the search/URL returned field 348 can store URLs that may be suggested to the user. Thus, instead of producing another search for the user, in which the user would need to sift through search results, the system 100 can suggest URLs that may be related to the user's past-viewed content. These suggested URLs may be provided as shown in FIG. 4.

Figure 4:
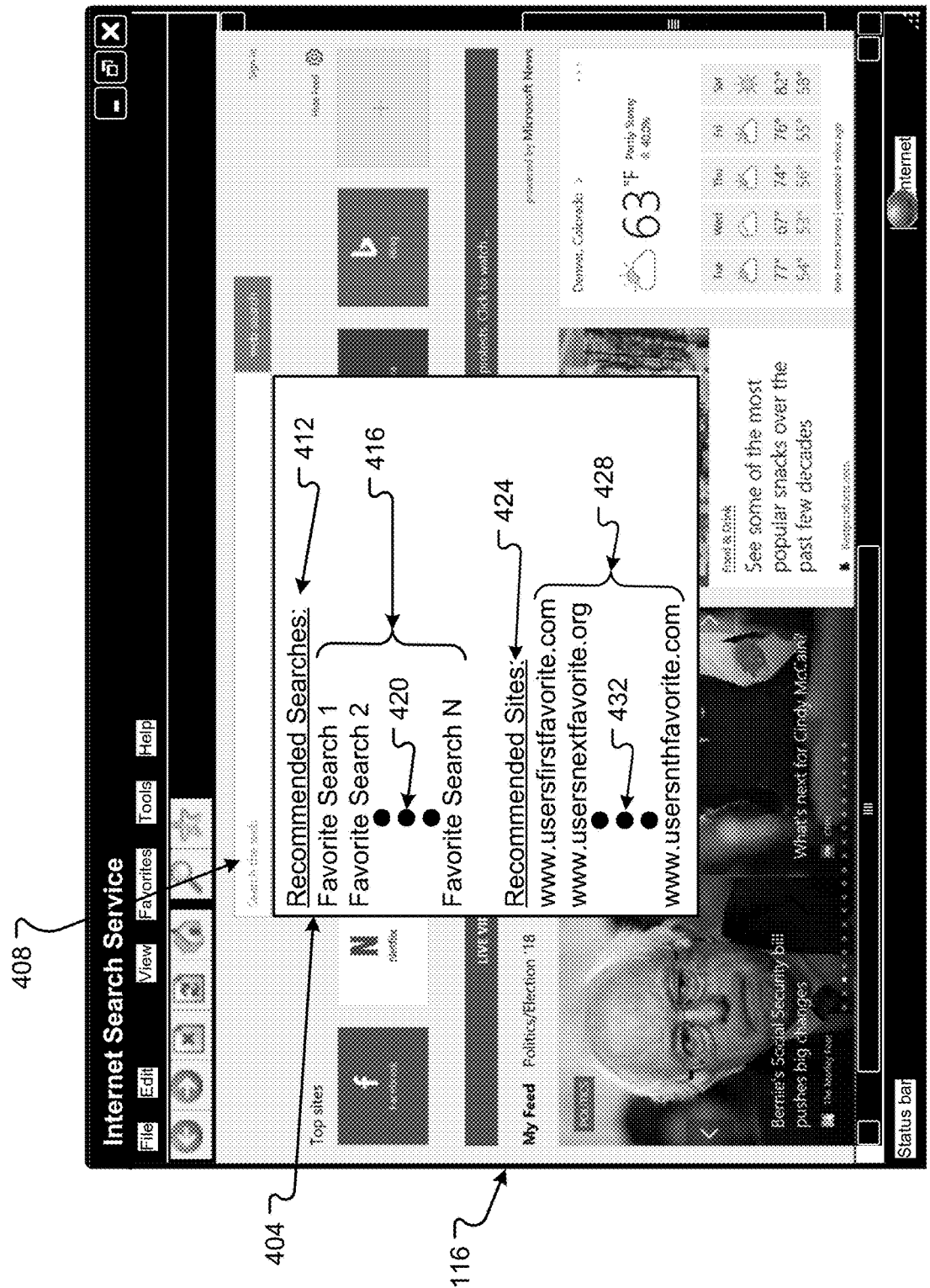
FIG. 4 illustrates a user interface for providing personalized search suggestions in accordance with the aspects of the disclosure.

A configuration of the user interface 116, as may be displayed in computing system 104, may be as shown in FIG. 4. A user interface 116 can include a web browser window that has received content from a search service 112 and rendered a web page for the user. The web page can be an interface to enter a query into a search engine. The web page can include a query entry area 408 that may accept the user's input of a query for the search engine.

Before the user enters the query, in the area 408 (possibly either after the web page is rendered and displayed or after the user places focus on area 408 by placing a cursor in area 408), a new user interface 404 may be provided to the user. The user interface 404 can be a pop-down window, as shown, a menu, a pop-up or pop-over window, or some other type of interface. The user interface 404 can provide one or more suggestions for a personalized and recommended search and/or site. One or more recommended searches may be provided in section 416 under the header or visual indicator "Recommended Searches:" 412. There may be provided more or fewer recommended searches than those shown in FIG. 4, as represented by ellipses 420. Each of the recommended searches is based on the user's past-viewed content and not necessarily or solely on the user's past searches. In other words, the searches 416 are not parroting or repeating past searches from a user's search history but provide search strings based on the key words/phrases data 320 that generate the searches 340. As there may be limited visual space for the list of suggestions, some limit on the number of suggestions may be enforced, e.g., only three search suggestions are shown. Thus, the three searches 340, with the highest rankings 356, may be provided.

Alternatively or additionally, the user interface 404 can also provide one or more suggestions for a personalized and recommended website. One or more recommended URLs may be provided in section 428 under the header or visual indicator "Recommended Sites:" 424. There may be provided more or fewer recommended URLs than those shown in FIG. 4, as represented by ellipses 432. Each of the recommended URLs is based on the user's past-viewed content and not necessarily or solely on the user's past searches. In other words, the URLs 416 are not repeating past search returns from a user's search history but provide URL strings based on the key words/phrases data 320 that generate the search 340 that return the URLs 340. As there may be limited visual space for the list of suggestions, some limit on the number of suggestions may be enforced, e.g., only three URL suggestions are shown. Thus, the three URLs 340 with the highest rankings 356 may be provided.

Figure 5:
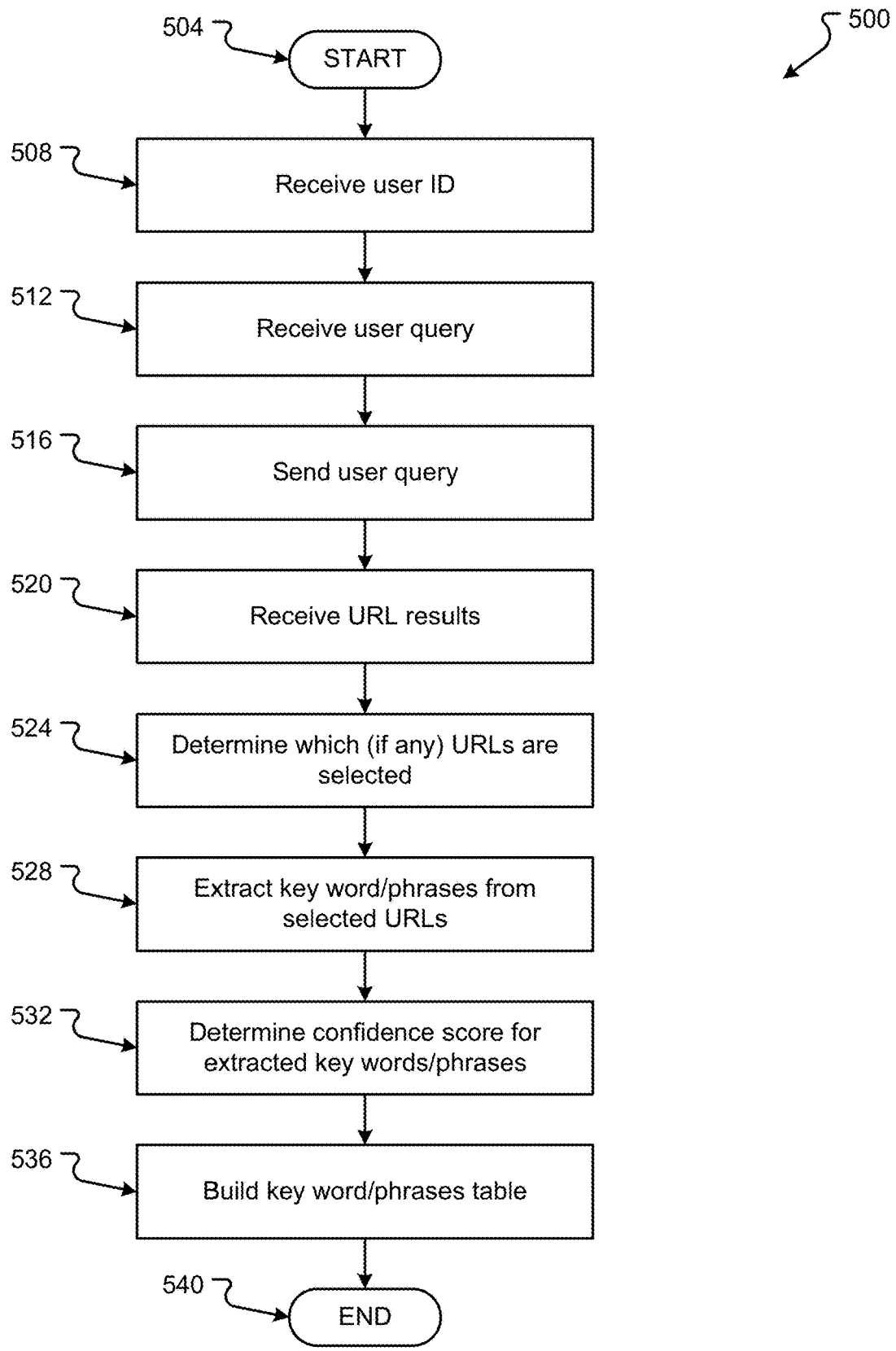
FIG. 5 illustrates a method for providing personalized search suggestions in accordance with the aspects of the disclosure.

A method 500 for building suggested or recommended searches may be as shown in FIG. 5. A general order for the steps of the method 500 is shown in FIG. 5. Generally, the method 500 starts with a start operation 504 and ends with an end operation 540. The method 500 can include more or fewer steps or can arrange the order of the steps differently than those shown in FIG. 5. The method 500 can be executed as a set of computer-executable instructions executed by a computer system and encoded or stored on a computer readable medium. Further, the method 500 can be performed by gates or circuits associated with a processor, Application Specific Integrated Circuit (ASIC), a field programmable gate array (FPGA), a system on chip (SOC), or other hardware device. Hereinafter, the method 500 shall be explained with reference to the systems, components, modules, software, data structures, user interfaces, etc. described in conjunction with FIGS. 1-4.

A search engine interface 206 can receive a user's ID, in step 508. When a user uses the search service 112, the user may login and provide a username, password, and/or other credentials. These credentials can identify the user. In other situations, the search engine interface 206 may request and receive or retrieve a user's ANID. Regardless, the user ID is passed to the middleware 208 for provision to the user table generator 220 to store or locate as user ID 304 in the user data table 300.

The user interface 116 can then receive a user query, for example a text entry into field 408, in step 512. The query can be a request for a search service 112 to search the Internet for content based on the input words/phrases, possibly with other parameters (e.g., time limits, geography limits, etc.). The web browser of the user device 104 can send the query information to the search service 112, over the network 108, in step 516. The search engine interface 206 can receive the query and execute the search. A list of URLs may be generated from the search and returned to the user computer 104, through the network 108. Further, the middleware 208 can also receive the search results, as returned URLs, in step 520.

From the returned URLs, the user may select one or more of the URLs. The web browser, on the user computer 104, may then navigate to that URL. The user interface 204, e.g., the search client, or other component on the user computer 104 may also send information about the selected URL to the search engine interface 206. This selected URL information is sent to the middleware 208 to determine that the user has selected a URL from the returned results, in step 524. The information and/or content associated with the selected URL may then be passed from the middleware 208 to the key phrase parser 212 and or user table generator 220. The user table generator 220 can store the query 208, at least a portion of the URLs returned 312, and/or the URLs selected 316 in the user data table 300.

The key phrase parser 212 may then extract key words/phrases from the selected URL(s), in step 528. As explained previously, the key phrase parser 212 may execute various NLP algorithms or processes to extract the key words/phrases from the selected URL content. For example, the key phrase parser 212 can use POS tagging to identify key words/phrases in the URL content. Further, the key phrase parser 212 may also determine the authority of the key words/phrases based on the frequency, prominence, or other measure of the key words/phrases in the selected URL content. The key words/phrases 324, authority data 328, and possible other data may be provided to the user table generator 220 for storage in the user data table 300.

In step 532, the key phrase ranker 224 and/or search/URL ranker 228 can determine the confidence score 352 for the extracted key word/phrase data 324 provided by the key phrase parser 212. Thus, based on algorithmic association of the key words to the URLs selected, the key word/phrases may be given a confidence score 332, as explained previously in conjunction with FIGS. 2, 3A, and/or 3B. This confidence score information 332 is then provided to the user table generator 220 to store in table 300.

The user table generator 220 then may build the user data table 300, in step 536. As such, the user table generator 220 can take the user ID 304, searches 308, the URLs returned 312, the URLs selected 316, and/or the key word/phrase data 320 to build the table 300. This table 300 may then be stored by the user table generator 220 within a database or other type of storage system, in memory (as described in conjunction with FIGS. 8-11) of the server 114 and/or computer system 104, and be made available to the search service 112 for further processing.

Figure 6:
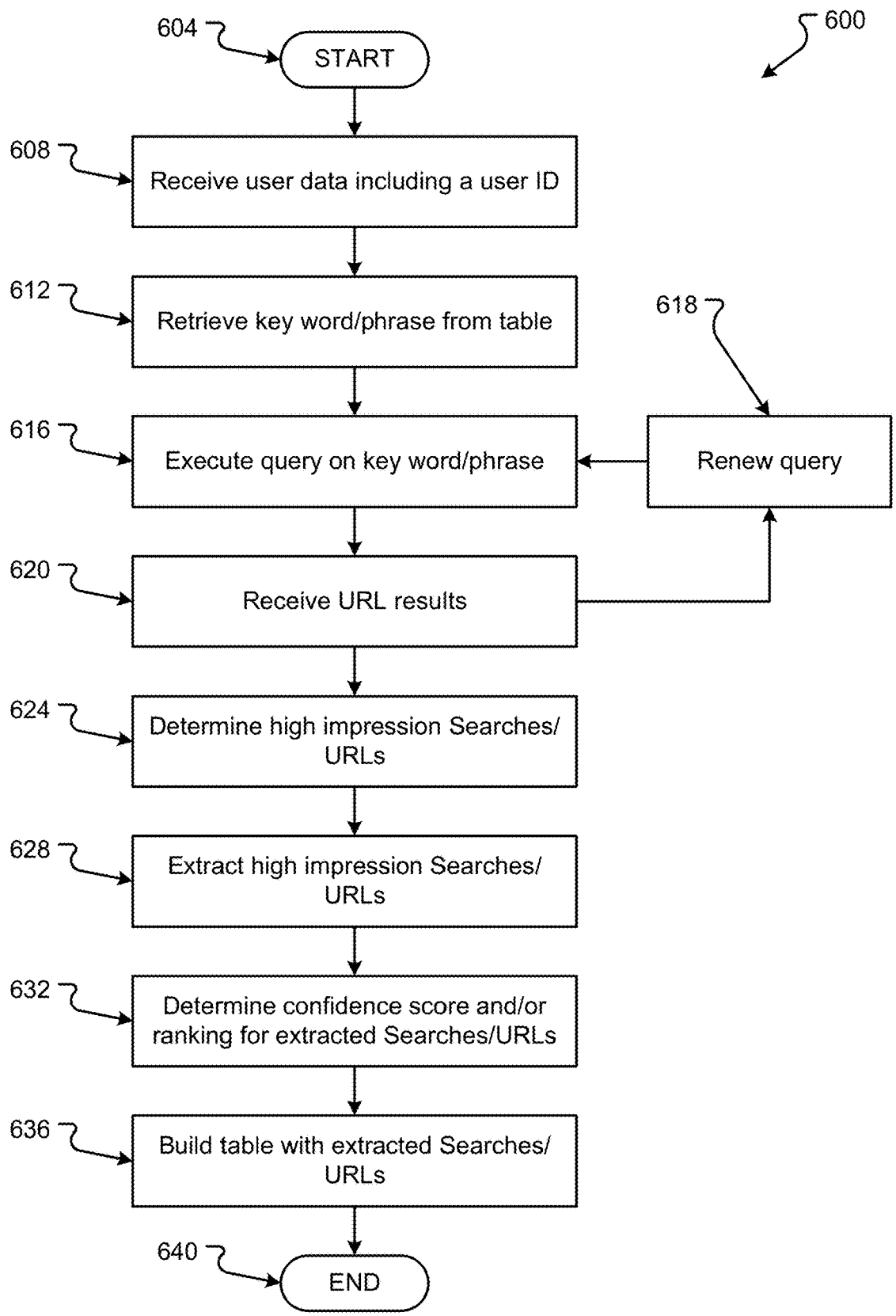
FIG. 6 illustrates another method for providing personalized search suggestions in accordance with the aspects of the disclosure.

A method 600 for generating suggested or recommended searches may be as shown in FIG. 6. A general order for the steps of the method 600 is shown in FIG. 6. Generally, the method 600 starts with a start operation 604 and ends with an end operation 640. The method 600 can include more or fewer steps or can arrange the order of the steps differently than those shown in FIG. 6. The method 600 can be executed as a set of computer-executable instructions executed by a computer system and encoded or stored on a computer readable medium. Further, the method 600 can be performed by gates or circuits associated with a processor, an ASIC, a FPGA, a SOC, or other hardware device. Hereinafter, the method 600 shall be explained with reference to the systems, components, modules, software, data structures, user interfaces, methods, etc. described in conjunction with FIGS. 1-5.

A query engine 216 can receive user information, for example, a user identifier 304, from a user data table 300, as stored in memory by the user table generator, in step 608. From the user ID 304, the query engine 216 can retrieve key word/phrase data 320 from the table 300, in step 612. The key word/phrase 324 may then be used to execute a query on that key word/phrase, in step 616. The query engine 216 may execute one or more queries on each key word/phrase 324, as described previously in conjunction with FIGS. 2-4. The queries can then generate URL results 344, in step 620. The query engine 216 can also renew a query, in step 618. To renew a query, the query engine 216 can execute a new query using the same key word/phrases in a different arrangement or order, using the same word/phrases in a same arrangement or order but with different parameters, using the same word/phrases at a different point in time, using different word/phrases, etc. These renewed queries also return URL results 620. The query engine 216 can repeat the renewal of the queries for a predetermined period of time, for a predetermined number of queries, until a predetermined or acceptable result is reached, etc. Regardless, repeating the queries ensures a better or best search or URL recommendation is obtained. Each search and the search parameters associated therewith may be provided to the user table generator 220 to store in the searches field 340. The URL results may also be provided to the user table generator 220 to associate the URL results with the search 340 and to store that information in the search/URL returned field 348.

A determination of whether the search 340 matches, is related to, and/or associated with the URLs selected 316 may then be determined. In other words, the search/URL ranker 228 can determine if the URLs returned 348, from the search 340, returned the URLs selected 316 by the user and in a higher order than other results. The high impression searches are those which return search results that are most similar to the desired URL selected 316 by the user.

In step 628, the search/URL ranker 228 can extract the high impression searches or URLs, in step 628. The search/URL ranker 228 then provides the high impression searches to the table generator 220 to save as suggested searches in the search/URL data 344. For example, a bit or other indicator can mark a search 340 as high impression or as suggested.

The search/URL ranker 228 then can evaluate key word/phrase information or metadata about the searches 340 to determine the confidence score and/or the ranking for the extracted searches, in step 632. The search/URL ranker 228 may determine, based on the impression score or other data, whether the search is the best search for providing the data desired by the user or is the best data desired by the user. For example, if a search 340 produces all or most of the URLs selected 316 in the search and in a higher or highest order, there is a higher confidence that that search is effective. Further, if a particular URL is consistently returned with several key word/phrase searches, there is a higher confidence that that URL would be desired by the user. These calculations and determinations may be as described in conjunction with FIGS. 2-3B. The search URL ranker 228 may then provide that information to the user table generator 220 to store as the confidence score 352. Further, the search/URL ranker 228 can rank the searches 340 and/or URLs by confidence score 352 and provide that information to the user table generator 220 to store as the ranking 356.

The user table generator 220 can receive the various information about the searches 340 and search/URL data 344 to amend or build table 300, in step 636. The user data table 300 may then be provided, by the user table generator 220, back to the middleware 208 to prepopulate suggested searches or URLs to the user with the search engine interface 206. The highest ranked searches 340 or URLs 348 may be provided as search suggestions or URL suggestions.

Figure 7:
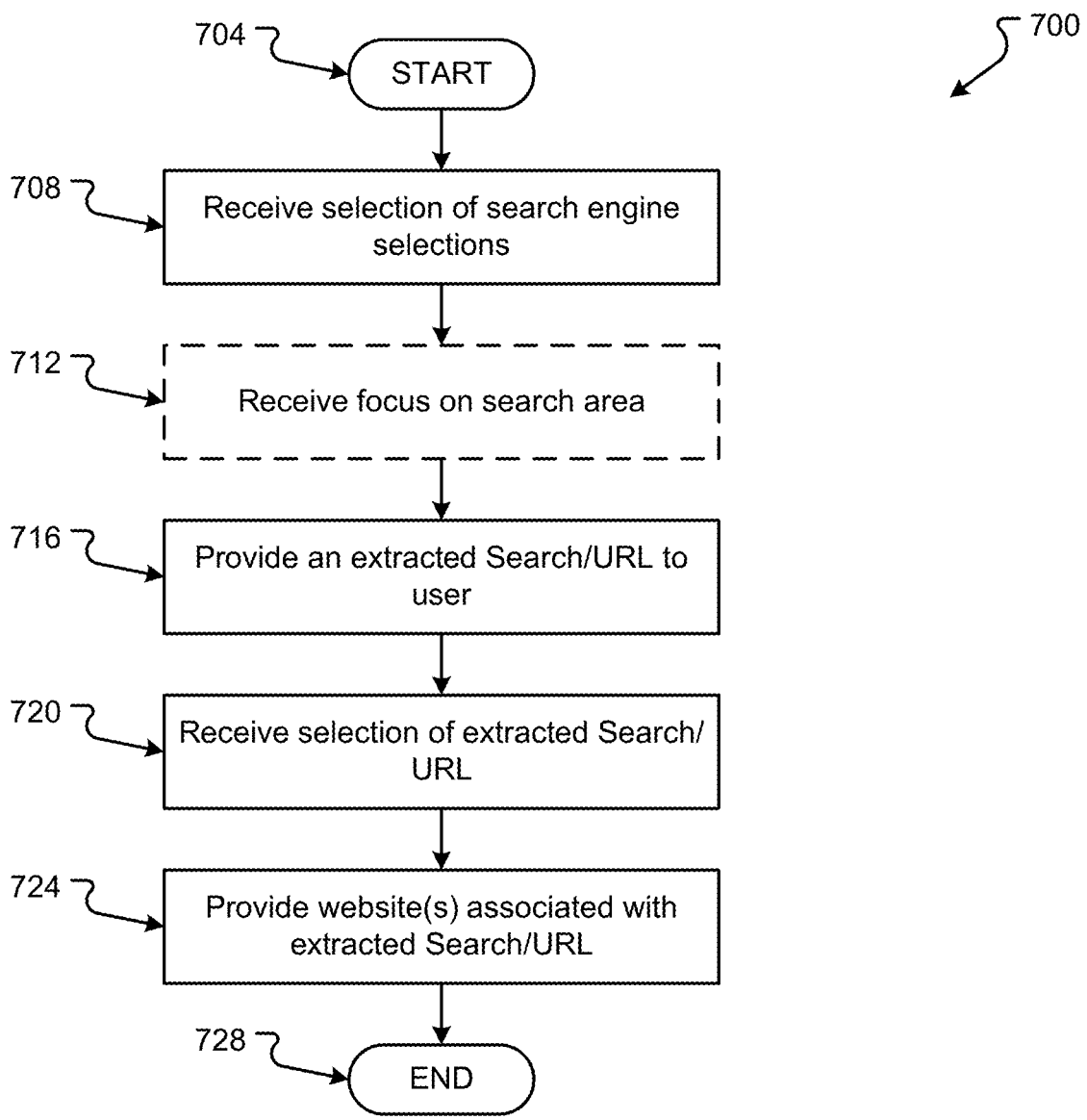
FIG. 7 illustrates another method for providing personalized search suggestions in accordance with the aspects of the disclosure.

A method 700 for providing user-personalized searches or URL suggestions may be as shown in FIG. 7. A general order for the steps of the method 700 is shown in FIG. 7. Generally, the method 700 starts with a start operation 704 and ends with an end operation 728. The method 700 can include more or fewer steps or can arrange the order of the steps differently than those shown in FIG. 7. The method 700 can be executed as a set of computer-executable instructions executed by a computer system and encoded or stored on a computer readable medium. Further, the method 700 can be performed by gates or circuits associated with a processor, an ASIC, a FPGA, a SOC, or other hardware device. Hereinafter, the method 700 shall be explained with reference to the systems, components, modules, software, data structures, user interfaces, methods, etc. described in conjunction with FIGS. 1-6.

The user interface 116 can receive a selection of a search engine, in step 708. A user may select a search engine button, enter in a web address, or indicate through another user interface interaction to request the URL of a search engine. The requested information may be sent, by a web browser executed at the user computer 104, to the server 114 executing the search service 112. A search engine interface 206 can then return a user interface 116 that can be rendered by the device 104 and provided on the user device's display.

In optional configurations, the computing device 104 may also receive focus in a search area 408, in step 712. Thus, the user may place or click the cursor in the search area 408 to provide focus within that region 408. Regardless of whether the search engine being selected or focus being placed on the search area 408 is the trigger, the computer 104 can send an indicator to the search engine interface 206 that the user desires to conduct a search.

The search engine interface 206 can provide the indicator to the middleware 208. The middleware 208 can retrieve the user data table 300 to read and retrieve recommended searches 340 and/or recommended URLs (from data 438). The middleware 208 can then provide these recommendations back to the search engine interface 206 for provision in user interface data to be sent to the user computer 104. Based on the received suggestions, the search engine interface 206 may then provide the suggestions to the user computer 104, in step 716, which can show the recommended searches or recommended sites. Thus, the search engine interface 206 can provide the recommended searches, as favorite searches 416 in user interface 404, which are based on content previously viewed by the user rather than repeating a user's search history or parroting or repeating past searches. In alternative or additional configurations, the user interface 404 can also provide recommended sites 428 that may be related to content previously viewed by the user. These suggested URLs may not have been viewed by the user previously.

The user interface 116 may then display the suggestions 416/428, in a user interface portion 404. The user interface 116 may then receive a selection of a personalized search or URL suggestion, in step 720. Thus, the user may select one of the user's selectable search suggestions, shown in area 416, or URL suggestions, shown in area 428. Upon selection of the personalized suggestion in area 416 or 428 (by, for example, a user clicking with a cursor on the user-selectable link), the computer 104 can send a request to either the search engine interface 206 or to the suggested URL. The search engine interface 206 or the selected website may then return search results or website content that is to be provided to the computer 104 for rendering in the user interface 116, in step 724.

While example user interface elements and user experience techniques have been described above, it will be appreciated that other elements and/or techniques may be used in conjunction with an inferred user data table 300 or user profile without departing from the spirit of this disclosure.

Figure 8:
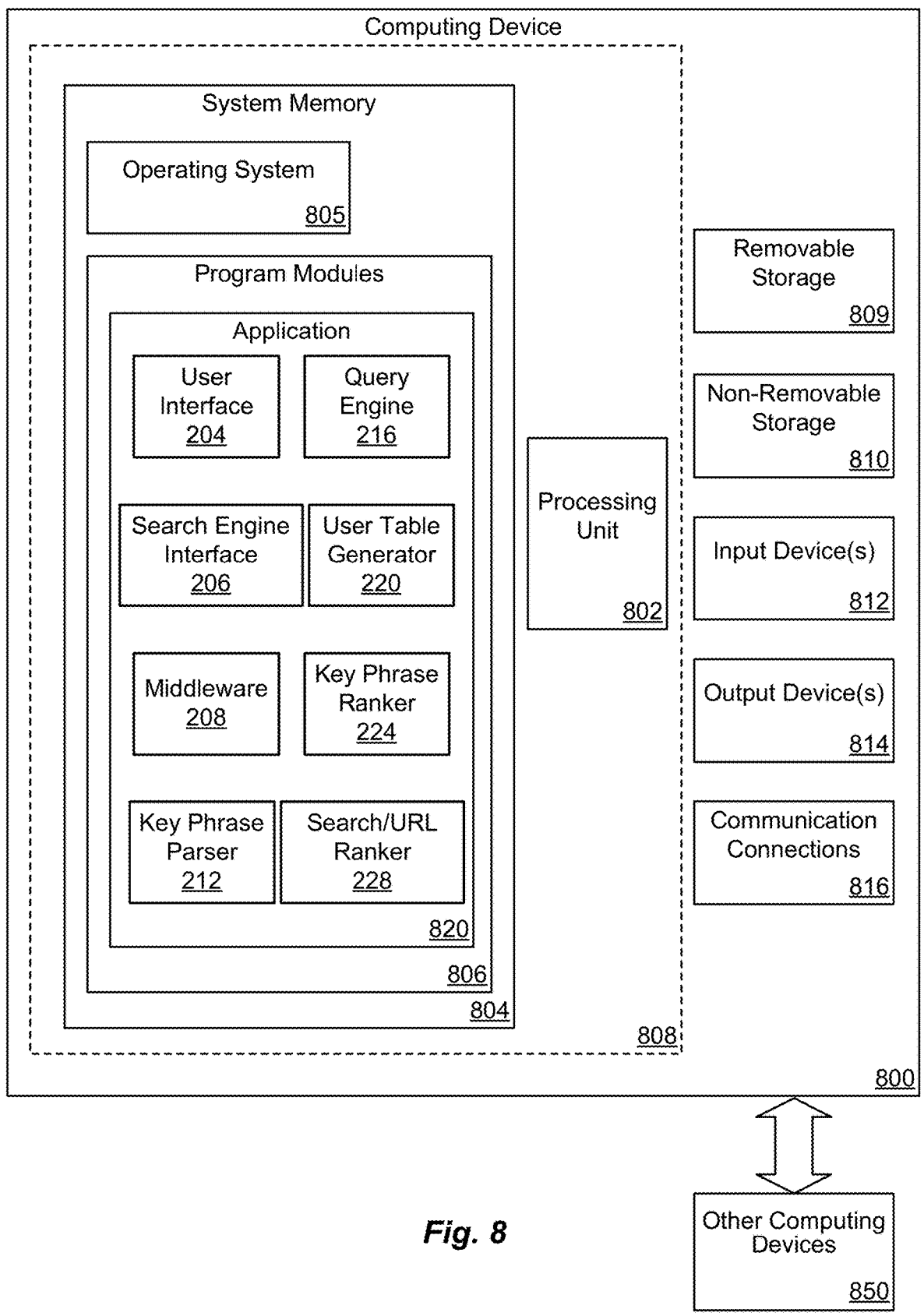
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may be suitable for the computing devices described above. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 808 and one or more program modules 806 suitable for performing the various aspects disclosed herein such as identity provider 824 and attribute inference processor 826. The operating system 808, for example, may be suitable for controlling the operation of the computing device 800. Furthermore, aspects of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., application 820) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 880. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9A:
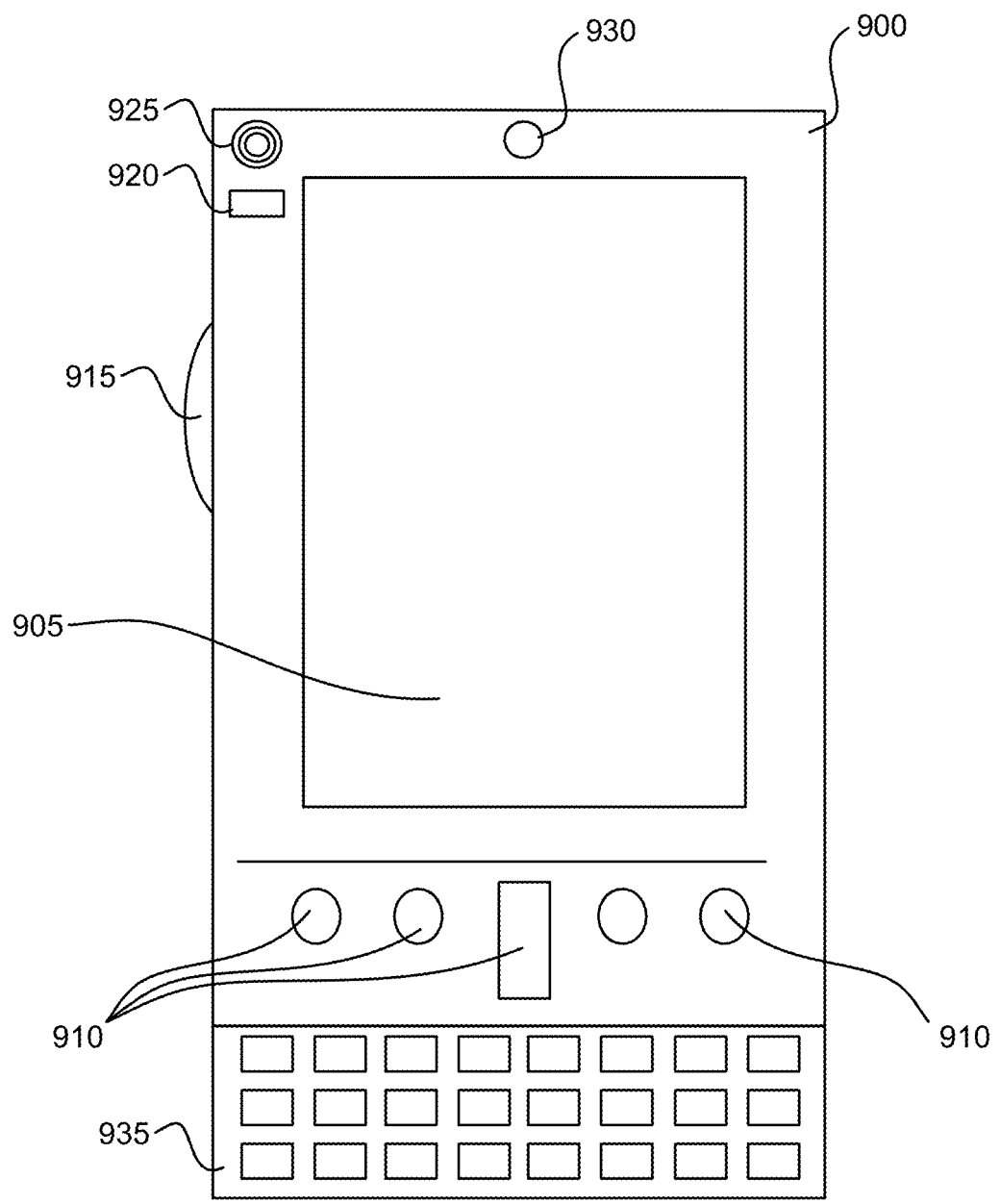
FIG. 9A is a simplified block diagram of a computing device with which aspects of the present disclosure may be practiced.
Figure 9B:
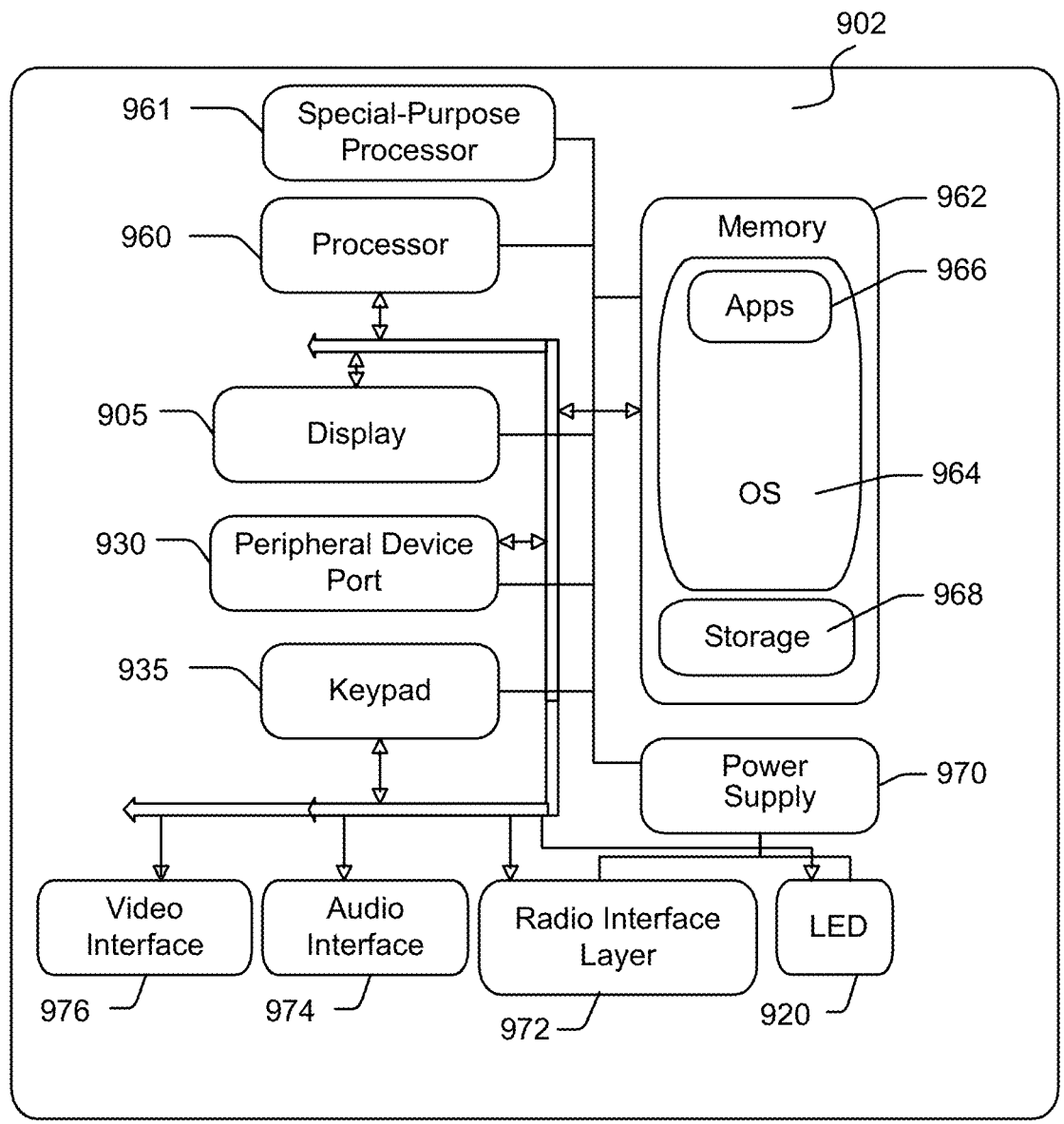
FIG. 9B is another are simplified block diagram of a mobile computing device with which aspects of the present disclosure may be practiced.

FIGS. 9A and 9B illustrate a computing device or mobile computing device 900, for example, a mobile telephone, a smart phone, wearable computer (such as a smart watch), a tablet computer, a laptop computer, and the like, with which aspects of the disclosure may be practiced. In some aspects, the client (e.g., computing system 104) may be a mobile computing device. With reference to FIG. 9A, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or less input elements. For example, the display 905 may not be a touch screen in some aspects. In yet another alternative aspect, the mobile computing device 900 is a portable phone system, such as a cellular phone. The mobile computing device 900 may also include an optional keypad 935. Optional keypad 935 may be a physical keypad or a "soft" keypad generated on the touch screen display. In various aspects, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one aspect of computing device, a server (e.g., server 112), or a mobile computing device. That is, the computing device 900 can incorporate a system (e.g., an architecture) 902 to implement some aspects. The system 902 can implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900 described herein (e.g., search engine, extractor module, relevancy ranking module, answer scoring module, etc.).

The system 902 has a power supply 970, which may be implemented as one or more batteries. The power supply 970 might further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 920 may be used to provide visual notifications, and/or an audio interface 974 may be used for producing audible notifications via the audio transducer 925. In the illustrated configuration, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with aspects of the present disclosure, the microphone may also serve as an audio sensor to facilitate control of notifications, as will be described below. The system 902 may further include a video interface 976 that enables an operation of an on-board camera 930 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio interface layer 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 972 or via a distributed computing network. Similarly, such data/information may be readily transferred between computing devices for storage and use according to well-known data/information transfer and storage means, including electronic mail and collaborative data/information sharing systems.

FIG. 10 illustrates one aspect of the architecture of a system for processing data received at a computing system from a remote source, such as a personal computer 1004, tablet computing device 1006, or mobile computing device 1008, as described above. Content displayed at server device 1002 may be stored in different communication channels or other storage types. For example, various documents may be stored using a directory service 1022, a web portal 1024, a mailbox service 1026, an instant messaging store 1028, or a social networking site 1030. Unified profile API 1021 may be employed by a client that communicates with server device 1002, and/or attribute inference processor 1020 may be employed by server device 1002. The server device 1002 may provide data to and from a client computing device such as a personal computer 1004, a tablet computing device 1006 and/or a mobile computing device 1008 (e.g., a smart phone) through a network 1015. By way of example, the computer system described above may be embodied in a personal computer 1004, a tablet computing device 1006 and/or a mobile computing device 1008 (e.g., a smart phone). Any of these configurations of the computing devices may obtain content from the store 1016, in addition to receiving graphical data useable to be either pre-processed at a graphic-originating system, or post-processed at a receiving computing system.

Figure 11:
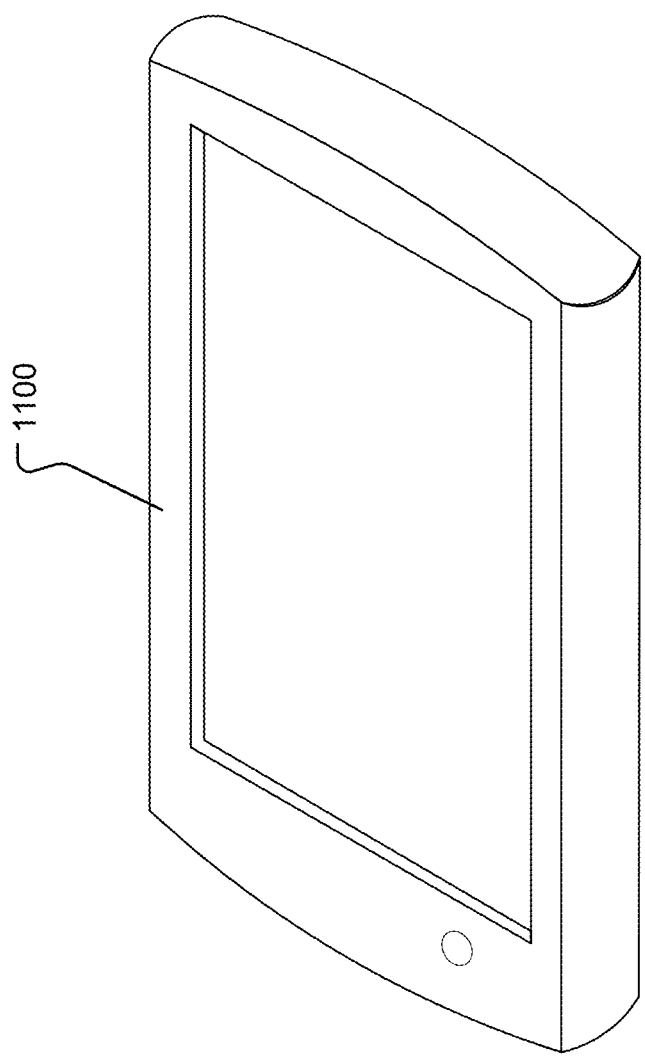
FIG. 11 illustrates a tablet computing device for executing one or more aspects of the present disclosure.

FIG. 11 illustrates an exemplary tablet computing device 1100 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which aspects of the disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

A number of variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an configuration with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Aspects of the present disclosure include a method comprising: receiving a first selection, of a search engine, in a computing device; before receiving a query in the search engine, providing a search suggestion, in a user interface associated with the search engine, for selection by a user, wherein the provided search suggestion is associated with first website content, wherein the first website content is associated with a past search, and wherein the first website content was selected by the user from the past search; receiving a second selection of the search suggestion without receiving a new query in the search engine, wherein a search, based on the search suggestion, is executed by a search service to obtain a uniform resource locator (URL) associated with second website content; receiving the URL; and displaying the URL to the user interface of the computing device.

Any of the one or more above aspects, wherein, based on the first selection, the search engine is triggered to provide the search suggestion.

Any of the one or more above aspects, wherein, the search engine receives a third selection of a user input area in the user interface, and wherein, based on the third selection, the search engine is triggered to provide the search suggestion.

Any of the one or more above aspects, wherein providing a search suggestion comprises providing a list of two or more URLs that are based on website content previously viewed by the user.

Any of the one or more above aspects, wherein providing a search suggestion comprises providing a list of two or more searches, wherein each search is associated with a key word/phrase that are based on website content previously viewed by the user.

Any of the one or more above aspects, wherein the search suggestion is provided in a drop down window beneath a user input area for entering a search query.

Any of the one or more above aspects, wherein the key word/phrase is extracted from the website content previously viewed by the user.

Any of the one or more above aspects, wherein the key word/phrase are associated with an authority score and/or a confidence score, which indicate whether the key word/phrase is related to content desired by the user.

Any of the one or more above aspects, wherein the two or more searches are associated with second confidence score, which indicates a likelihood that the search would return the first web site content.

Any of the one or more above aspects, wherein the two or more searches are rank ordered based on the confidence score.

Aspects of the present disclosure include a computer storage media having stored thereon computer-executable instructions that when executed by a processor cause the processor to perform a method, the method comprising: receiving an Internet search query at a search service from a user computer; determining a URL result in response to the Internet search query; sending the URL result to the user computer; determining if the URL result is selected; when the URL is selected, extracting a key word/phrase from website content associated with the selected URL; executing a second Internet search query based on the key word/phrase; and providing the second Internet search query as a suggestion in a user interface of the user computer.

Any of the one or more above aspects, wherein determining if the URL result is selected comprises receiving an indication that the URL is selected from the user computer.

Any of the one or more above aspects, wherein a confidence score is determined for the second Internet search query.

Any of the one or more above aspects, wherein the confidence score indicates whether the second Internet search query returns the selected URL.

Any of the one or more above aspects, wherein the second Internet search query is provided as a suggestion to the user computer before a user enters a new query into the user interface.

Aspects of the present disclosure include a system, comprising: a memory storing computer executable instructions; a processor in communication with the memory, wherein the processor reads the computer executable instructions from memory and when executing the computer executable instructions executes: a search engine interface that: during a first session associated with a user computer: receives an Internet search query from a user computer; determines a URL result in response to the Internet search query; sends the URL result to the user computer; determines if the URL result is selected; sends the selected URL result to a key word/phrase parser; during a second session with the user computer: sends a suggested search to the user computer to display in a user interface of the user computer before a user enters a second Internet search query in the user interface; the key word/phrase parser that: extracts a key word/phrase from website content associated with the selected URL; a query engine that: generates a third Internet search query based on the extracted key word/phrase; and provides the second Internet search query as the suggestion.

Any of the one or more above aspects, wherein the processor further executes a key phrase order that determines an authority score and/or a confidence score, which indicate whether the key word/phrase is related to content desired by the user.

Any of the one or more above aspects, wherein the processor further executes a search/URL ranker that determines a confidence score for the third Internet search query; wherein the confidence score indicates whether the third Internet search query returns the selected URL.

Any of the one or more above aspects, wherein the query engine renews the execution of the third Internet search query based on a different arrangement of the extracted key word/phrase, a different key word/phrase, and/or different parameters associated with the extracted key word/phrase.

Any of the one or more above aspects, wherein the search/URL ranker determines whether the renewed third Internet search query is more effective than the third Internet search query as originally generated.

Any one or more of the aspects as substantially disclosed herein.

Any one or more of the aspects as substantially disclosed herein optionally in combination with any one or more other aspects as substantially disclosed herein.

One or means adapted to perform any one or more of the above aspects as substantially disclosed herein.

What is claimed is:

1. A method comprising:
presenting a user interface to a user, the user interface coupled to a search service;
while presenting the user interface and before receiving a query input from the user in the user interface, providing a search suggestion for selection by the user in the user interface, wherein the provided search suggestion is based on a keyword from content of a first website that was selected by the user in a past search, and wherein the provided search suggestion is selected based on a confidence score of the keyword;
receiving a selection of the search suggestion from the user;
providing the search suggestion to the search service;
in response to providing the search suggestion to the search service, obtaining a uniform resource locator (URL) for a second website from the search service;
presenting the URL within the user interface; and
providing a second search suggestion for selection by the user, the second search suggestion based on a second keyword having a second confidence score, wherein the search suggestion and the second search suggestion are ordered within the user interface based on the confidence score and the second confidence score.

2. The method of claim 1, wherein the search suggestion is provided in response to a user interaction with a search area within the user interface.

3. The method of claim 1, further comprising, before receiving the query input, providing within the user interface a list of two or more URLs that are based on website content previously viewed by the user.

4. The method of claim 1, wherein the search suggestion is provided in a drop down window beneath a user input area for entering a search query.

5. The method of claim 1, wherein the keyword is extracted from the first website content.

6. The method of claim 1, wherein the confidence score indicates a likelihood that a search using the search suggestion returns the first website.

7. The method of claim 1, wherein the provided search suggestion is further based on an authority score of the keyword, the authority score indicating how often the keyword appears in the first website content.

8. A search system comprising:
a processor; and
memory storing computer-executable instructions that, when executed by the processor, cause the search system to:
presenting a user interface to a user, the user interface coupled to a search service;
while presenting the user interface and before receiving a query input from the user in the user interface, provide a search suggestion for selection by the user in the user interface, wherein the provided search suggestion is based on a keyword extracted from content of a first website that was selected by the user during a past search, and wherein the provided search suggestion is selected based on a confidence score of the keyword;
receive a selection of the search suggestion from the user;

in response to providing the search suggestion to the search service, receive, from a search service, a uniform resource locator (URL) associated with second website content;

present the URL the user interface of the search system; and providing a second search suggestion for selection by the user, the second search suggestion based on a second keyword having a second confidence score, wherein the search suggestion and the second search suggestion are ordered based on the confidence score and the second confidence score.

9. The search system of claim 8, wherein the keyword comprises a phrase.

10. The search system of claim 8, wherein the keyword is associated with an authority score, which indicates how often the keyword appears in the content of the first website.

11. The search system of claim 8, wherein the confidence score indicates a degree of relatedness between the keyword and content desired by the user.

12. The search system of claim 8, wherein the search suggestion is provided in response to a user interaction with a search area within the user interface.

13. The search system of claim 8, further comprising, before receiving the query input, providing within the user interface a list of two or more URLs that are based on website content previously viewed by the user.

14. The search system of claim 8, wherein the confidence score indicates a likelihood that a search using the search suggestion returns the first website.

15. A computer readable storage medium including instructions that, when executed by a processor, cause a set of operations comprising:

presenting a user interface to a user, the user interface coupled to a search service;

while presenting the user interface and before receiving a query input from the user, providing a search suggestion for selection by the user in the user interface, wherein the provided search suggestion is based on a keyword extracted from content of a first website that was selected by the user during a past search, and wherein the provided search suggestion is selected based on a confidence score of the keyword;

receiving a selection of the search suggestion from the user;

providing the search suggestion to the search service;

in response to providing the search suggestion to the search service, receiving, from a search service, a uniform resource locator (URL) for a second website from the search service;

presenting the URL within the user interface; and providing a second search suggestion for selection by the user, the second search suggestion based on a second keyword having a second confidence score, wherein the search suggestion and the second search suggestion are ordered based on the confidence score and the second confidence score.

16. The computer readable storage medium of claim 15, wherein the keyword is associated with an authority score, which indicates how often the keyword appears in the content of the first website.

17. The computer readable storage medium of claim 15, wherein the confidence score indicates a degree of relatedness between the keyword and content desired by the user.

18. The computer readable storage medium of claim 15, wherein the search suggestion is provided in response to a user interaction with a search area within the user interface.

19. The computer readable storage medium of claim 15, wherein the search suggestion is provided in a drop down window beneath a user input area for entering a search query.

20. The computer readable storage medium of claim 15, wherein the confidence score indicates a likelihood that a search using the search suggestion returns the first website.

\* \* \* \* \*